United States Patent [19]

Röhrle

[11] Patent Number: 5,562,543
[45] Date of Patent: Oct. 8, 1996

[54] TORSION DAMPER, ESPECIALLY FOR A MOTOR VEHICLE

[75] Inventor: Dieter Röhrle, Montmorency, France

[73] Assignee: Valeo, Paris, France

[21] Appl. No.: 163,794

[22] Filed: Dec. 9, 1993

[30] Foreign Application Priority Data

Dec. 9, 1992 [FR] France .................... 92 14825

[51] Int. Cl.$^6$ .................................................. F16D 3/14
[52] U.S. Cl. ................................................ 464/68; 464/66
[58] Field of Search ........................ 464/64, 66, 68; 192/106.2, 212, 70.17; 74/574

[56] References Cited

U.S. PATENT DOCUMENTS

| | | | |
|---|---|---|---|
| 4,595,039 | 6/1986 | Naudin | 464/66 |
| 4,747,801 | 5/1988 | Chasseguet et al. | 464/66 |
| 4,874,350 | 10/1989 | Casse et al. | 464/66 X |
| 4,899,617 | 2/1990 | Kobayashi et al. | 464/68 X |
| 4,950,205 | 8/1990 | Umeyama | 464/64 X |
| 5,052,244 | 10/1991 | Kamiya et al. | 464/66 X |
| 5,065,642 | 11/1991 | Kagiyama et al. | 464/68 X |
| 5,092,820 | 3/1992 | Naudin et al. | 464/66 X |
| 5,307,710 | 5/1994 | Feldhaus et al. | 464/68 X |
| 5,377,560 | 1/1995 | Schierling et al. | 464/68 X |
| 5,380,248 | 1/1995 | Kraus et al. | 464/68 |

FOREIGN PATENT DOCUMENTS 3931429  4/1990  Germany .

Primary Examiner—Daniel P. Stodola
Assistant Examiner—Eileen A. Dunn
Attorney, Agent, or Firm—Longacre & White

[57] ABSTRACT

A torsion damper, especially though not exclusively for a motor vehicle clutch, is of the kind having two coaxial parts, namely a primary coaxial part and a secondary coaxial part, which are mounted for rotation one with respect to the other against the action of at least one spring which is arranged with its length extending generally circumferentially along an arc of a circle. The spring comprises a succession of at least two straight portions continuous with each other and defining median lines, each of which is tangential to the arc of a circle.

7 Claims, 2 Drawing Sheets

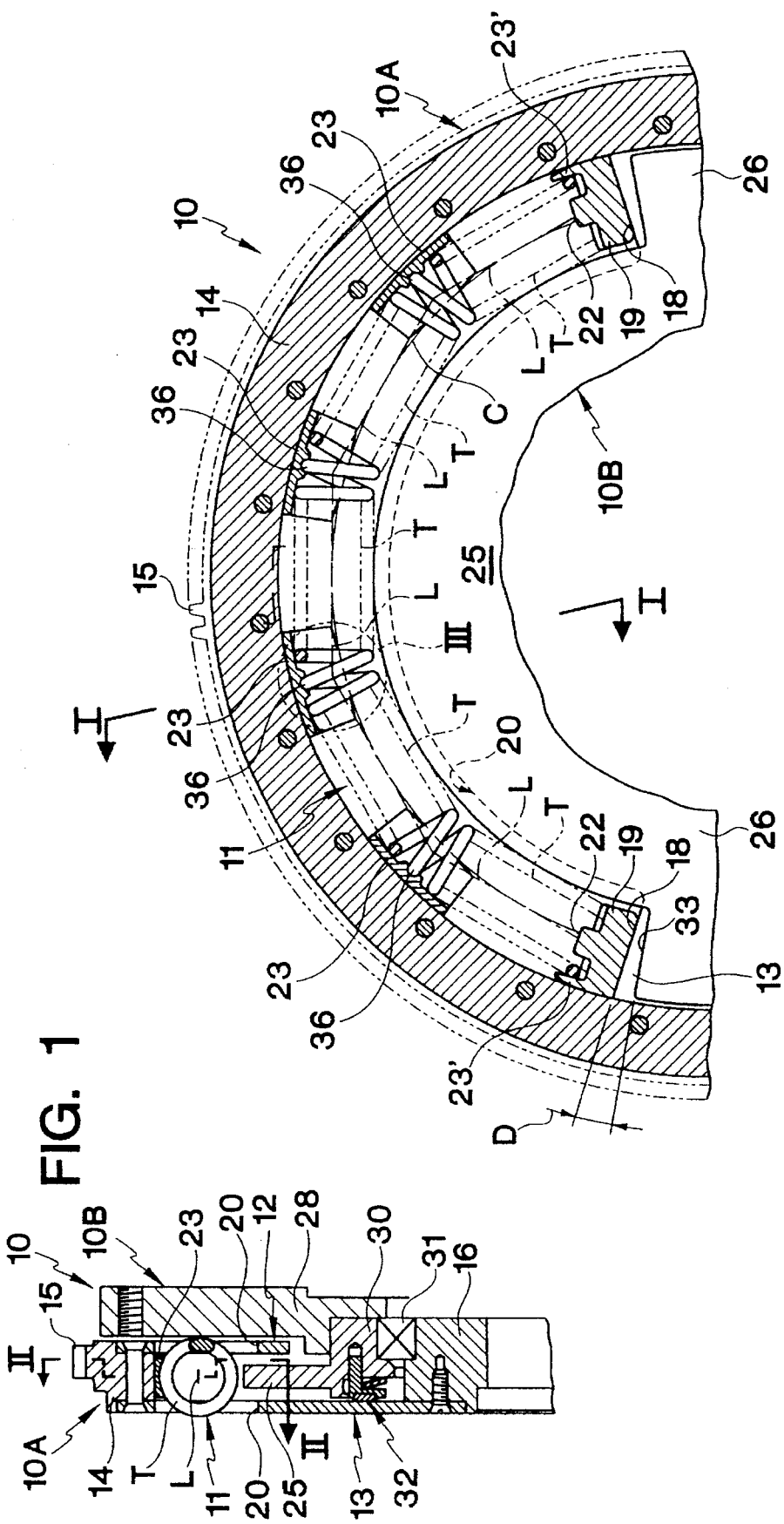

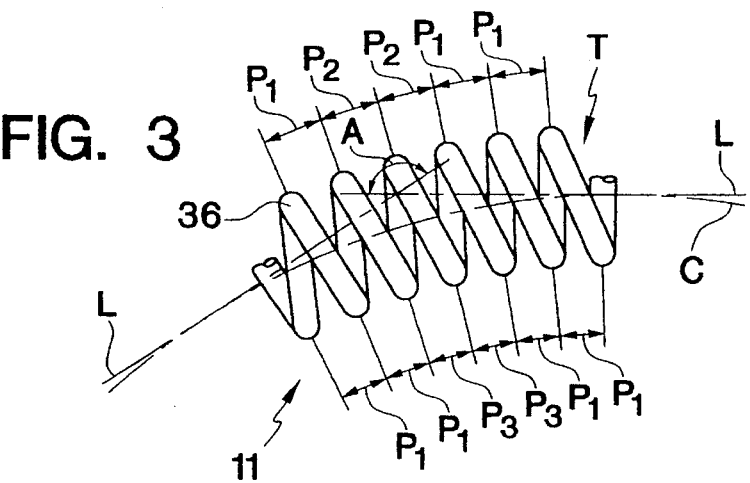
FIG. 3
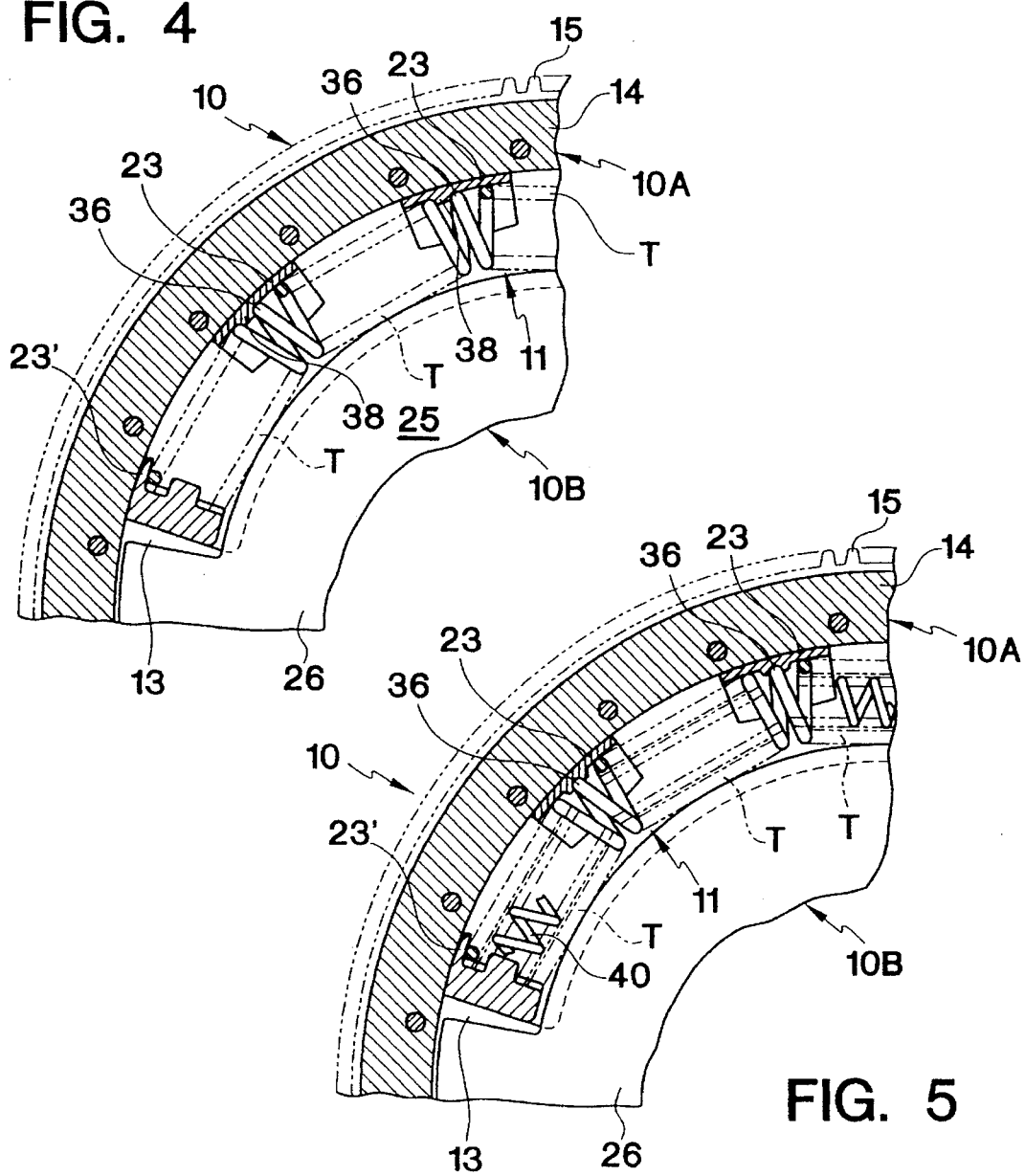
FIG. 4
FIG. 5

TORSION DAMPER, ESPECIALLY FOR A MOTOR VEHICLE

FIELD OF THE INVENTION

This invention relates to torsion dampers, especially though not exclusively for motor vehicles, and being generally of the kind comprising two coaxial parts, namely a primary coaxial part and a secondary coaxial part, which are mounted for rotation of one with respect to the other against the action of at least one spring, the length of which is generally aligned along an arc of a circle.

A torsion damper of this kind may for example be part of a clutch, which may be a disengageable clutch or, alternatively, a clutch of the kind which is arranged within the casing of an hydraulic coupling member. The purpose of the torsion damper is to provide suitable absorption for vibrations occurring between the engine of the vehicle and the road wheels.

The invention is more particularly directed to the case in which, for particular reasons concerned with damping, at least one of the springs employed is relatively long, such that the angle subtended by the above mentioned arc of a circle at the centre of the circle (i.e. on the axis of the torsion damper assembly) is for example greater than 90 degrees. Usually such a spring is of relatively low stiffness.

BACKGROUND OF THE INVENTION

With a spring of this type, one of the difficulties encountered is that the spring has to be fitted within the housing defined in the torsion damper for containing the spring (this housing being necessarily curved), at least without the occurrence of any friction not serving a useful purpose. In this connection, the spring can tend to make radial contact between the ends of the spring, in an uncontrolled way and such as to give rise to unwanted parasitic friction, with one or both of the two coaxial parts of the torsion damper.

A first solution which is known in the art consists in shaping the spring so as to match its housing, by preforming it with a curvature similar to that of the housing. However, the process of shaping the spring in this way, which involves either increasing the separation of its various turns on the radially outer side, one by one, or directly hot-forming the spring as a whole, is tiresome and costly.

A second known solution consists in dividing the spring into distinct portions of its length, by interposing between these predetermined portions of the spring spacing pads which are of suitable wedge shapes. The spring then becomes effectively a multiplicity of straight springs, connected in series in accordance with a generally polygonal profile, instead of a single curved spring having a circular profile. With this arrangement, apart from the fact that these intermediate spacing pads between the straight springs are additional components, which adds to the cost, it is necessary to cut or machine one turn of each of the straight springs, at each end of the latter, so as to provide a suitable thrust surface for the spring to bear on the spacing pads.

The general result of this is that, other conditions being equal, the efficiency of the arrangement is reduced to a degree depending on the total number of turns which thus have to be cut, and which are therefore made thinner or even "dead". This effect is inevitable in a spring which is arranged in this manner.

DISCUSSION OF THE INVENTION

An object of the invention is to provide a torsion damper not having the disadvantages mentioned above.

According to the invention, a torsion damper, especially for a motor vehicle, of the kind comprising two coaxial parts, namely a primary coaxial part and a secondary coaxial part respectively, which are mounted for rotation of one with respect to the other against the action of at least one spring, the length of which extends generally circumferentially over an arc, is characterised in that the or each said spring comprises at least two successive straight portions continuous with each other and each of which defines a median line, each said median line being tangential to the said arc of a circle. The spring is preferably preformed.

In all cases, at the junction between two of its straight portions, only one turn of the spring is spaced away from the turns immediately adjacent to it on either side, which has the advantage of minimising the forming operation necessary, while in addition, apart from the fact that there are now no intermediate spacing pads, only the two endmost turns of the spring need be cut or otherwise modified in order to provide suitable thrust surfaces. This is especially true in the case where the spring has more than two of these straight portions so that the general profile of the spring is polygonal.

Thus in general terms, the spring in a torsion damper according to the invention is quite easy to make, because the forming operation necessary is applied to only a limited number of turns of the spring and can preferably be carried out cold; in addition, there are no "dead" turns except the dead turns at the very ends of the spring.

The various features and advantages of the invention will appear more clearly on a reading of the detailed description of preferred embodiments of the invention which follows, and which is given by way of example only and with reference to the accompanying simplified drawings.

BRIEF DESCRIPTION OF THE DRAWINGS

FIG. 1 is a view in axial cross section showing part of a torsion damper in one form according to the present invention, the cross section being taken on the broken line I—I in FIG. 2.

FIG. 2 is a partial view in transverse cross section taken on the line II—II in FIG. 1.

FIG. 3 repeats, on a larger scale, the detail of a spring which is contained in FIG. 2 within the phantom circle at III.

FIG. 4 is a partial view in transverse cross section, similar to FIG. 2 but repeating only one part of the latter, and illustrating a second embodiment of the invention.

FIG. 5 is a partial view in transverse cross section similar to FIG. 2 but repeating only one part of the latter, and illustrating a third embodiment of the invention.

DESCRIPTION OF PREFERRED EMBODIMENTS OF THE INVENTION

As shown in the drawings, and in a manner which is known in itself, the torsion damper 10 comprises two coaxial parts, namely a primary coaxial part 10A and a secondary coaxial part 10B. The two parts 10A and 10B are mounted for rotation of one with respect to the other against the action of at least one spring 11, the length of which extends generally circumferentially over, and defines, an arc C of a pitch circle defined by the parts 10A and 10B. In the present case the arc C subtends nearly 180 degrees at the centre of the circle, as can be seen from FIG. 2. On one common pitch circle (of which the arc C is a part), there are only two of these springs 11, and only one of these springs is shown in the drawings.

One typical application of this torsion damper is to the reaction plate, or flywheel of a disengageable clutch, especially a motor vehicle clutch. The examples now to be described and shown in the drawings relate to a torsion damper for such a clutch.

The primary coaxial part 10A comprises two annular, radial plates 12 and 13, which are spaced apart axially by an outer ring 14 at their outer periphery, i.e. that having the greatest diameter. The outer ring 14 carries a starter crown 15. The annular plate 12 has a radial depth smaller than that of the annular plate 13, and the latter carries at its inner periphery (i.e. the periphery having the smaller diameter) a hub 16 which is adapted to be coupled in rotation to the crankshaft of the engine of the vehicle. The annular plate 12 has thrust surfaces 18, and the annular plate 13 has similar thrust surfaces 18 corresponding with those of the plate 12. The springs 11 bear circumferentially, in the rest or relaxed position, against the thrust surfaces 18, through spacing blocks 19 which are arranged for this purpose at each of the circumferential ends of the spring 11. In the present case the thrust surfaces 18 are defined by the circumferential ends of windows 20 which are formed locally through the annular plates 12 and 13. The springs 11 are mounted in these windows 20. The spacing blocks 19 extend from one of the radial plates 12, 13 to the other through their windows 20, and each spacing block 19 is formed with a guide boss 22, projecting circumferentially towards the associated spring 11 which is engaged over the boss.

In the present case the damper also includes shoes 23 which are spaced apart along the length of each spring 11, on the radially outer side of the latter. These shoes act as spacers between the springs 11 and the outer ring 14, preventing the springs 11 from making direct contact with the outer ring 14. With the same purpose, each spacing block 19 is formed with a circumferential extension 23' which is in contact with the outer ring 14, and which thereby prevents the associated end of the spring 11 from coming into contact with the outer ring.

As to the secondary coaxial part 10B of the torsion damper, this comprises an annular damper plate 25 and a plate 28 (or reaction plate). The annular damper plate 25 is arranged between the two annular plates 12 and 13 of the primary coaxial part 10A, and is formed with arms 26 which extend radially and circumferentially between the spacing blocks 19, so as to interfere with the latter, at least when the angular displacement between the coaxial parts 10A and 10B exceeds a predetermined amount. The reaction plate 28 lies outside the volume delimited by the annular plates 12 and 13, at the side of the shorter annular plate 12. The reaction plate 28 is secured by means of screws (not shown in the drawings) to a hub 30 which carries the annular damper plate 25. The reaction plate 28 is arranged to be coupled in rotation on the input shaft of the associated gearbox, through a friction disc (not shown) of the clutch.

A rolling bearing 31 provides a radial coupling between the two coaxial parts 10A and 10B, whereby the secondary coaxial part 10B is mounted on the hub 16 of the primary coaxial part 10A. Axial coupling between the two coaxial parts is provided by friction means 32. The bearing 31 and friction means 32 will not be described in any detail here because they are of no particular relevance to the present invention.

The radial edges 33 of the arms 26 of the annular damper plate 25 of the secondary coaxial part 10B extend, in the rest position mentioned above, at an angular distance D from the thrust surfaces 18 of the annular plates 12 and 13 of the primary coaxial part 10A. The edges 33 are therefore also spaced from the spacing blocks 19 by the same distance D, so that it is only after an angular displacement D, equal to this distance D, has taken place between the two coaxial parts that, in operation, the arms 26 come into interfering relationship with the spacing blocks 19 and therefore with the springs 11.

As described so far, the arrangement consists of features known per se, and these will therefore not be described in any greater detail here.

At least one of the springs 11 (and in practice each of them) comprises at least two successive straight portions T continuous with each other, and defining respective median lines L coincident with the respective axes of these straight portions. The median line L of each straight portion T is tangential to the arc C. In practice, each spring 11 is preformed, and comprises more than two successive straight portions T continuous with each other. As shown in FIG. 2, there are five of these straight portions T. Thus each straight portion T of one spring 11 subtends an angle of about 30 degrees at the axis of the assembly.

In the rest position, the straight portions T of a spring 11 may for example have, at least in their middle section, a common pitch, or standard pitch, P1 (see FIG. 3), measured between successive turns of the spring. However, at the junction of each straight portion T with the next there is at least one turn 36 (here referred to as a junction turn). The pitch P2 which separates the junction turn 36 from the adjacent turns on the radially outer side is greater than the pitch P3 which separates it from the same adjacent turns on the radially inner side. In other words, at the junction between two successive straight portions T, each spring 11 has a bend, of which the junction turn 36 constitutes, so to speak, the central part.

This bend is produced for example by opening out the spring 11 on either side of the junction turn 36. Therefore, the median lines L of two successive straight portions T make an obtuse angle A between them at the common junction turn 36, as shown in FIG. 3.

In the present case the pitch P2 on either side of the junction turn 36 on the radially outer side is greater than the standard pitch P1, while the pitch P3 on the radially inner side is smaller than the standard pitch P1. However, it is not obligatory that this should be so, so that for example, the pitch P3 may be equal to the standard pitch P1.

In FIGS. 1 and 2, each of the shoes 23 is snap-fitted on to one junction turn 36 between two straight portions T of a spring 11, so that the shoe 23 is movable by the spring 11 during the angular displacement between the two coaxial parts 10A and 10B of the torsion damper.

In the modification shown in FIG. 4, with a view to such movement of the shoes 23", each shoe 23" has a boss 38 which is engaged between the corresponding junction turn 36 (lying between two straight portions T of the associated spring 11) and the endmost turn of one of these straight portions. With this arrangement shown in FIG. 4, it is clearly not possible for any compression to occur between the two turns of the spring between which the boss 38 of any one shoe 23 is engaged. However, since these turns are abutted against the shoe on the radially outer side, this arrangement does have the advantage that the risk of buckling is minimised in the straight portions T of the spring. In other words, the boss 38 is so arranged that is protects the turns of the spring on the radially inner side, preventing those turns from coming into contact with each other on that side.

In every case, since the shoes 23″ are located at the bends of the spring 11 between two successive straight portions T of the latter, the straight portions T have the advantage that they are spaced further away from the outer ring 14, to which they form chords. This would not be the case if the spring consisted of successive curved portions which followed the outer ring 14 coaxially. In operation therefore, the effect of centrifugal force, whereby the springs may accidentally come into contact with the outer ring 14, is very small.

Referring now to FIG. 5, each spring 11 in this embodiment is accompanied by another spring 40 arranged inside it. The spring 40 may be shaped with straight portions in the same way as the spring 11, with the straight portions of the spring 40 corresponding to those of the spring 11 in which it is fitted; alternatively, the spring 40 may be a simple curved spring.

The invention is not limited to the embodiments described above and shown in the drawings, but embraces any other embodiment. In particular, the cavity in which the springs are contained may be enclosed and may contain grease, in accordance with (for example) arrangements of the same type as those described in the specification of German published patent application DE 3 931 429A.

The field of application of the invention also extends not only to disengageable clutches a described, but also to clutches of the kind which work within the casing of a hydraulic coupling member, or to clutches having a friction disc of the same type as that described in U.S. Pat. No. 4,530,673.

What is claimed is:

1. A torsion damper for a motor vehicle, comprising:
   a primary coaxial part; and
   a secondary coaxial part, said secondary part and said primary coaxial part being mounted for rotation of one with respect to the other, against the action of at least one spring the length of which extends generally circumferentially over an arc of a circle, wherein said at least one spring is preformed and comprises more than two successive straight portions continuous with each other, each of said successive straight portions defines a median line, each said median line being tangential to said arc.

2. A torsion damper according to claim 1, wherein,
   said at least one spring comprises a plurality of successive turns adjacent to one another each having a radially outer side and a radially inner side; and
   between each of said successive straight portions of said at least one spring there is formed a junction therebetween, at said junction there is at least one junction turn of the spring, defining a first pitch separating it from an adjacent turn of said spring on said radially outer side thereof, and further defining a second pitch separating it from said adjacent turn on said radially inner side thereof, said first pitch being greater than said second pitch.

3. A torsion damper according to claim 1, wherein at least one shoe is provided between said at least one spring and said primary coaxial part on a radially outer side of said at least one spring, and said at least one shoe is snap-fitted on a junction turn defining a junction between two successive straight portions said at least one spring.

4. A torsion damper according to claim 1, wherein at least one shoe is provided between said at least one spring and said primary coaxial part positioned on a radially outer side of said at least one spring, said at least one shoe having a boss engaged between a junction turn of said at least one spring defining the junction between two successive straight portions of said at least one spring, and an adjacent endmost turn of one of said successive straight portions.

5. A torsion damper according to claim 1, further including an additional spring arranged inside of said at least one spring.

6. A torsion damper according to claim 1, wherein said at least one spring comprises more than three successive straight portions continuous with each other.

7. A torsion damper according to claim 1, wherein said at least one spring comprises at least five successive straight portions continuous with each other.

* * * * *